No. 693,291. Patented Feb. 11, 1902.
D. LUTZ.
BALL BEARING.
(Application filed Oct. 30, 1901.)
(No Model.)
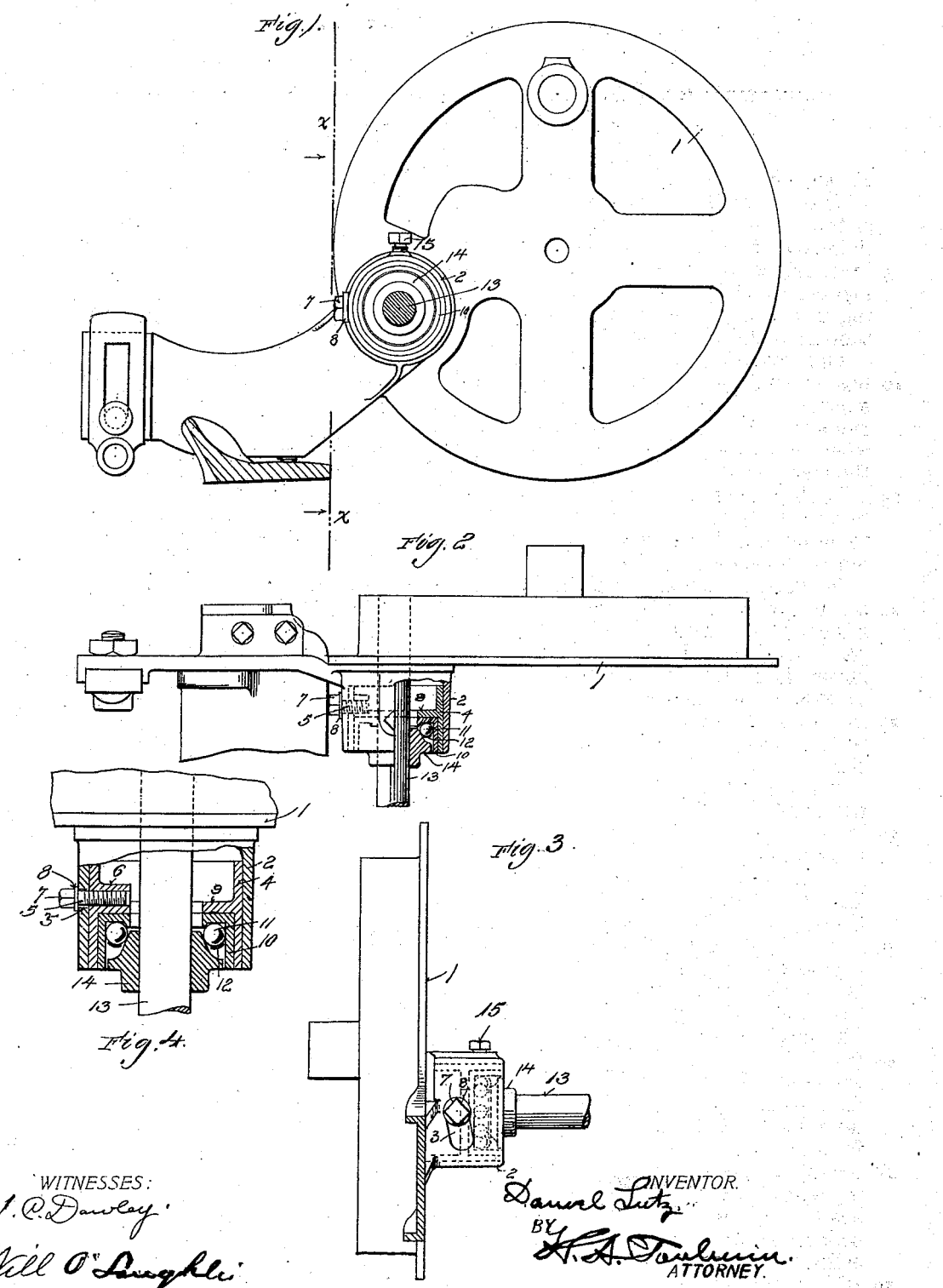

UNITED STATES PATENT OFFICE.

DANIEL LUTZ, OF SPRINGFIELD, OHIO, ASSIGNOR TO THE THOMAS MANUFACTURING COMPANY, OF SPRINGFIELD, OHIO, A CORPORATION OF OHIO.

BALL-BEARING.

SPECIFICATION forming part of Letters Patent No. 693,291, dated February 11, 1902.

Application filed October 30, 1901. Serial No. 80,483. (No model.)

*To all whom it may concern:*

Be it known that I, DANIEL LUTZ, a citizen of the United States, residing at Springfield, in the county of Clark and State of Ohio, have invented certain new and useful Improvements in Ball-Bearings, of which the following is a specification, reference being had therein to the accompanying drawings.

This invention relates to ball-bearings, and has for its object to provide a simple and inexpensive construction whereby the adjustment of such bearings may be effected and whereby the bearing may be connected with the frame or support on which it is mounted.

To these ends the invention consists in certain novel features, which I will now proceed to describe and will then particularly point out in the claims.

In the accompanying drawings, Figure 1 is a side elevation of a portion of the frame of a lawn-mower having my improvements applied thereto. Fig. 2 is a plan view of the same, partly in section. Fig. 3 is a sectional view taken on the line $x$ $x$ of Fig. 1 and looking in the direction of the arrows, and Fig. 4 is an enlarged detail sectional view of a portion of Fig. 2.

In the drawings I have shown my invention as applied to a mower, to which it is particularly adapted, although it is obvious that it is capable of other applications.

In said drawings, 1 indicates a portion of the mower, to which the frame or support of the mower, to which there is attached or with which there is formed integrally a collar or annular flange 2, which is adapted to receive the bearing and which is provided with an inclined slot 3. Within the collar 2 is located a bearing-sleeve 4, which fits snugly within the collar, but which is capable of rotary and longitudinal movement therein when free. A projection 5 extends from the sleeve 4 through the slot 3 in the collar 2, and this projection is preferably in the form of a screw which takes into a threaded socket 6, formed on the sleeve 4, the projecting end of said screw being provided with a head 7, by which it may be rotated, and a collar 8 to bear upon the outer surface of the collar 2. The sleeve 4 is provided internally with a ledge or flange 9 to form a seat for the bearing-cup 10, which fits within the end of the sleeve 4 and rests against the flange 9. Antifriction-balls 11 are placed within this cup and are preferably held therein by a suitable retainer 12. The shaft 13, for which the bearing is intended, is provided with a cone 14, which bears against the ball. As an additional securing device I employ a set-screw 15, which passes through the collar 2 and impinges upon the sleeve 4. Where the projection 5 is not a screw and has no clamping functions, the set-screw 15 alone serves to hold the sleeve stationary within the collar; but where the projection 5 is a screw, as shown, then the set-screw 15 is an additional fastening device to prevent displacement of the parts of the bearing after adjustment in case the screw 5 should become loose.

It will be seen that when the screws are loosened the sleeve may be turned within the collar by means of the projecting head 7 of the screw 5, and such turning of the sleeve will move the same, together with the bearing-cup and balls, toward or from the cone 14 on the shaft 13, this movement taking place owing to the inclination of the slot 3. By this means the bearing may be readily adjusted and after adjustment may be secured by tightening up the screws. The construction is simple and inexpensive and particularly adapted for use in connection with mowers and similar mechanisms.

I do not wish to be understood as limiting myself to the precise details of construction hereinbefore described, as the same may obviously be varied without departing from the principle of my invention.

Having thus fully described my invention, what I claim as new, and desire to secure by Letters Patent, is—

1. The combination, with a frame or support, of a collar thereon provided with an inclined slot, a sleeve fitting within the collar, a projection extending through said slot, said sleeve having a ball-raceway, means for fixing said sleeve within the collar, balls located within the raceway, and a shaft provided with a cone to bear against the balls, substantially as described.

2. The combination, with a frame or support, of a collar thereon provided with an inclined slot, a sleeve fitting and movable within the collar, a screw threaded into the sleeve and extending through the slot, said sleeve being provided with a ball-raceway, balls located within the raceway, and a shaft provided with a cone bearing against the balls, substantially as described.

3. The combination, with a frame or support, of a collar thereon provided with an inclined slot, a sleeve fitting and movable within the collar, a screw threaded into the sleeve and extending through the slot in the collar, said sleeve being provided with a ball-raceway, balls located in said raceway, a shaft provided with a cone to bear against the balls, and a set-screw threaded through the collar and impinging on the sleeve, substantially as described.

4. The combination, with a frame or support, of a collar thereon provided with an inclined slot, a sleeve fitting and movable within the collar, a projection extending through the slot therein, said sleeve being provided with a cup-seat, a bearing-cup fitting tightly within said seat and provided with a raceway, balls located in said raceway, a shaft provided with a cone to bear against said balls, and means for fixing the sleeve within the collar, substantially as described.

In testimony whereof I affix my signature in presence of two witnesses.

DANIEL LUTZ.

Witnesses:
 E. O. HAGAN,
 IRVINE MILLER.